(12) United States Patent
Madsen

(10) Patent No.: US 6,941,338 B1
(45) Date of Patent: Sep. 6, 2005

(54) DISTRIBUTED CACHE FOR A WIRELESS COMMUNICATION SYSTEM

(75) Inventor: James S. Madsen, Del Mar, CA (US)

(73) Assignee: NextWave Telecom Inc., Greenwich, CT (US)

( * ) Notice: Subject to any disclaimer, the term of this patent is extended or adjusted under 35 U.S.C. 154(b) by 0 days.

(21) Appl. No.: 09/388,236

(22) Filed: Sep. 1, 1999

(51) Int. Cl.[7] .............................................. G06F 15/16

(52) U.S. Cl. ....................... 709/203; 709/217; 709/218; 709/219; 370/336; 370/338; 713/201; 713/118; 713/707; 713/10

(58) Field of Search ........................... 707/10; 709/219, 709/218, 203, 217; 713/201, 118; 370/336, 338

(56) References Cited

U.S. PATENT DOCUMENTS

| | | | | |
|---|---|---|---|---|
| 5,924,116 A | * | 7/1999 | Aggarwal et al. | 709/204 |
| 5,991,306 A | * | 11/1999 | Burns et al. | 370/429 |
| 6,167,438 A | * | 12/2000 | Yates et al. | 709/216 |
| 6,208,620 B1 | * | 3/2001 | Sen et al. | 370/231 |
| 6,229,792 B1 | * | 5/2001 | Anderson et al. | 370/280 |
| 6,282,542 B1 | * | 8/2001 | Carneal et al. | 707/10 |
| 6,295,457 B1 | * | 9/2001 | Narayanaswamy | 455/466 |
| 6,363,397 B1 | * | 3/2002 | Kitayama | 707/103 R |
| 6,591,288 B1 | * | 7/2003 | Edwards et al. | 709/203 |
| 2001/0051525 A1 | * | 12/2001 | Rayne | 455/453 |
| 2002/0094813 A1 | * | 7/2002 | Koshimizu et al. | 455/436 |

FOREIGN PATENT DOCUMENTS

| | | | | |
|---|---|---|---|---|
| EP | 967559 A1 | * | 12/1999 | G06F/17/30 |
| GB | 2301746 A | * | 11/1996 | G06F/9/44 |
| GB | 2 317 723 | | 4/1998 | |
| WO | WO 99/05584 | | 2/1999 | |
| WO | WO 9905584 A2 | * | 2/1999 | |

OTHER PUBLICATIONS

R. Malpani, J. Lorch, and D. Berger, Making World Wide Web Caching Servers Cooperate, Proc. of the 4th Int. WWW Conference, Boston, MA, Dec. 1995 (http://www.w3j.com/1/lorch.059/paper/059.html).*

J. Touch. The LSAM proxy cache—a multicast distributed virtual caceh. In Proc. of the 3rd Int. WWW Caching Workshop, Jun. 1998.*

Solutions for Internet Services Providers. www.cacheflow.com 1 page.

CacheFlow Document Center (1998) ISP Caching Deployment Guide http://www.cacheflow.com/info/docs/wp/isp_guide.html 10 pages.

"Intellicom Brings Wireless Internet Access to Rural Communities", Internet Document, Oct. 5, 1998, XP-002165799.

Housel, et al., "WebExpress: A Client/Intercept Based System for Optimizing Web Browsing in a Wireless Environment", Mobile Networks and Applications No. 3, pp. 419-431, 1998, XP-000998754.

(Continued)

Primary Examiner—Hosain Alam
Assistant Examiner—Shabana Qureshi
(74) Attorney, Agent, or Firm—Knobbe, Martens, Olson & Bear, LLP

(57) ABSTRACT

In a wireless system comprising a plurality of radio base station, each base station services a portion of the system. A cache is associated with each base station. The cache stores files regularly requested by the remote unit within the coverage area of the corresponding base station. When a base station receives a message from a remote unit, it parses the message to determine if the message comprises a file request. If so, the base station determines whether the file is available from the cache. If available, the base station responds to the request by forwarding the requested file from the cache. If the file is not available, the base station forwards the message to a central controller, which retrieves the file via the Internet from the appropriate content server and provides it to the base station.

21 Claims, 4 Drawing Sheets

OTHER PUBLICATIONS

"LinuxSA Mailing List Archives Re: Wireless Networking", Internet Document, Jun. 24, 1999, XP–002165800.

Ross, "Hash Routing for Collections of Shared Web Caches", IEEE Network, vol. 11, No. 6, Nov. 1, 1997, pp. 37–44, XP–000737464.

Varhol, "Embedding the Web", Computer Design, vol. 36, No. 12, Dec. 1997, pp. 77–80, 82–84, XP–000754855.

Chinen, et al., "An Interactive Prefetching Proxy Server for Improvement of WWW Latency", Proceedings of INET 1997; The Internet: The Global Frontiers, vol. 1/3, Jun. 8, 1997, XP–002086569.

Gerben, "Release Notes for Version 1.1 of the Squid Cache", Internet Document, Jul. 16, 1997, XP–002165801.

Seneviratne, et al., "Cellular Networks and Mobile Internet", Computer Communications vol. 21, No. 14, Sep. 14, 1998.

"Netscape Screenshot" Internet Document, Apr. 20, 2001, XP–002165802.

* cited by examiner

DISTRIBUTED CACHE FOR A WIRELESS COMMUNICATION SYSTEM

BACKGROUND OF THE INVENTION

1. Field of the Invention

The invention relates generally to wireless communication systems and, more particularly, to digital data transfer in a wireless communication system.

2. Description of the Related Art

Digital data communication systems are becoming more and more pervasive. For example, the Internet is commonly used to transfer digital data in the form of e-mail messages, web pages as well as audio, graphic and video information in digital format between many users and servers. FIG. 1 is a block diagram showing a typical Internet digital data system. The Internet "cloud" 10 interconnects a large number of users and content servers. In order to gain access to the Internet cloud 10, an Internet service provider 12 acts as a gateway between the Internet cloud 10 and a group of users 14A–14N.

In the normal course of "surfing the web", a user accesses a series of web pages stored within a variety of content servers 8A–8N coupled to the Internet cloud 10. In general, a user requests a web page via browser software. The browser software retrieves the web page using a group of protocols defining the Internet. For example, the browser software uses the HyperText Transfer Protocol (HTTP) on top of Transmission Control Protocol/Internet Protocol (TCP/IP) to retrieve the web page. During the retrieval process, the user must wait as the browser software first makes a request for a Domain Name System (DNS) to find the appropriate content server, and then individually requests and receives the set of objects that make up the web page.

Each HTTP request to the content server opens a new TCP connection. After the connection is established, the user's browser software sends the HTTP request for the specific hypertext markup language (HTML) object. The wait experienced by the user is caused by the round-trip delay from the HTTP latency as all the HTML objects which compose the hypertext markup language (HTML) file are retrieved from the Internet.

The content server can be located many thousands of miles away from the user. Over such great distances, even if the messages were able to travel the speed of light, a significant latency would be accumulated by the numerous round-trip delays associated with retrieving each object.

The HTML file is digital data file that provides information to the browser such as display information. Generally, the HTML file comprises a set of embedded HTML objects. For example, the embedded objects may include Java applets, JPEG or GIF graphical objects, video files or sound clips. For example, a typical web page, such as the YAHOO!® home page, is an HTML file which designates many embedded objects such as advertisement banners, headline banners, the YAHOO!® logo and linking soft buttons. As an entire web page is retrieved, the browsers used by the users 14A–14N individually request each of the embedded objects. Thus, the response time associated with creating a fully displayed web page includes the time required to retrieve both the HTML file and all of the embedded objects referenced therein.

In order to decrease the waiting time of the system as well as decrease the amount of data that is transferred between the Internet 10 and the Internet service provider 12 of FIG. 1, the Internet service provider 12 may incorporate a cache 16. Generally, the cache 16 may be embodied as a fast storage buffer or memory that can be accessed by a central processing unit within the Internet service provider 12. The cache 16 can be used to store HTML objects and other files such as graphic files or sound clips that are commonly requested by the users 14A–14N. For example, the YAHOO!® home page HTML file is likely to be accessed by a large number of the users 14A–14N on a daily basis. Therefore, in order to avoid downloading the YAHOO!® HTML file with its many HTML embedded objects multiple times during the day, the common objects which constitute the page can be stored in the cache 16 and retrieved from the cache 16 by the Internet service provider 12 when requested by one of the users 14A–14N. Because it is faster for the Internet service provider 12 to retrieve the files from the cache 16 than through the Internet 10 from the content servers 8, the waiting time perceived by the user is decreased.

Several factors must be determined when designing an efficient cache system. For example, because the cache 16 has a finite memory storage capacity, the Internet service provider 12 must determine which HTML objects are most likely to be requested by the users 14A–14N. Therefore, usage pattern algorithms have been developed which determine which HTML objects should be stored in the cache 16 based upon the usage pattern of the users 14A–14N. In addition, the information in the cache 16 must be updated at regular time intervals. For example, a web page which provides stock quotes at approximately real time must be updated every several seconds. An advertising banner, such as might be shown on the YAHOO!® homepage, may be updated every hour. Other information on the YAHOO!® homepage, such as the morning headlines, may be updated once or twice a day. Other objects, such as the YAHOO!® logo, may remain valid for much longer periods of time. The usage pattern algorithm must also determine which HTML objects are worthy of caching and which are updated with such frequency as to be unworthy. In addition, the usage pattern algorithm can be used to determine when a HTML object stored in the cache 16 should be deleted and retrieved once again from the Internet 10 in order to update the file.

Based upon these factors, using an efficient usage pattern algorithm, as well as a manageable sized cache, it is reasonable to expect that approximately 60% of the data requested by the users 14A–14N can be stored within the cache 16. Even if the storage capacity of the cache 16 is greatly increased, it is difficult to achieve a caching rate at greater than 60% based upon modern Internet usage patterns.

The Internet service provider 12 can be coupled to the users 14A–14N using a variety of well-known techniques. For example, a copper line such as a standard, directly coupled plain old telephone service (POTS) can be used to connect the Internet service provider 12 to the remote unit 14A. Also cable modems and other digital subscriber lines (DSL) have been developed in order to increase the data rate of the connection between the Internet service provider and the user.

Using modern wireless communication techniques, the Internet service provider 12 can be coupled to one or more of the users 14A–14N using a wireless link rather than a wired line link. Typically, the finite capacity of the wireless link as well as the limited transmission rate of the wireless link can cause additional delays in the transmission of data between the Internet service provider and the user. In such a system, the benefits of reducing latencies in other areas of the system becomes more pronounced as cumulative delays increase the response time perceived by the users.

FIG. 2 is a block diagram of a prior art digital data system providing Internet connection over a wireless link. In FIG. 2, the system is configured as a terrestrial, system. A series of radio base stations 20A–20N are distributed throughout a geographic area where wireless Internet access is provided by the internet service provider 12. Each radio base station 20A–20N provides wireless communications to and from remote users within a corresponding physical coverage area. For example, in FIG. 2, users 14A–14N are shown to be within the coverage area of the base station 20A. Thus, when a remote unit requests digital data, such as a web page, a request for the web page is passed from the user 14 to the associated base station 20A. The base station 20A passes the request to the Internet service provider 12 incurring yet additional delays. The Internet service provider 12 provides the requested information from the cache 16 or through the Internet cloud 10 from the content servers 8A–8N, if the HTML objects are not available within the cache 16. The reverse process carries the objects back to the user, incurring yet additional delays. As noted above, the cumulative delay associated with transmission of the request over the wireless link as well as the other delays associated with response to the request can become intolerably high to the end-user.

Therefore, there has been a long felt need in the art to provide a means and method for providing efficient digital data access in a wireless communication system.

SUMMARY OF THE INVENTION

In a wireless system comprising a set of limited physical coverage areas, a base station provides service over a wireless link to a plurality of users within one of the limited physical coverage areas. The base station is coupled to an Internet service provider via a backhaul. The Internet service provider is coupled to many content servers via a digital data network. Each base station has an associated cache. The cache is used to store files and objects which are frequently requested by the users within the limited physical coverage area associated with the corresponding base station. When a user sends a message comprising a request for a file or object to the base station, the base station parses the message. If the requested file or object is available from the cache, the base station forwards the file or object to the user from the cache. In this way, the request need not be sent over the backhaul or over the digital data network, thereby greatly improving the response time of the wireless system.

BRIEF DESCRIPTION OF THE DRAWINGS

The features, objectives, and advantages of the invention will become more apparent from the detailed description set forth below when taken in conjunction with the drawings wherein like parts are identified with like reference numerals throughout, and wherein.

DETAILED DESCRIPTION OF THE INVENTION

Figure 1:
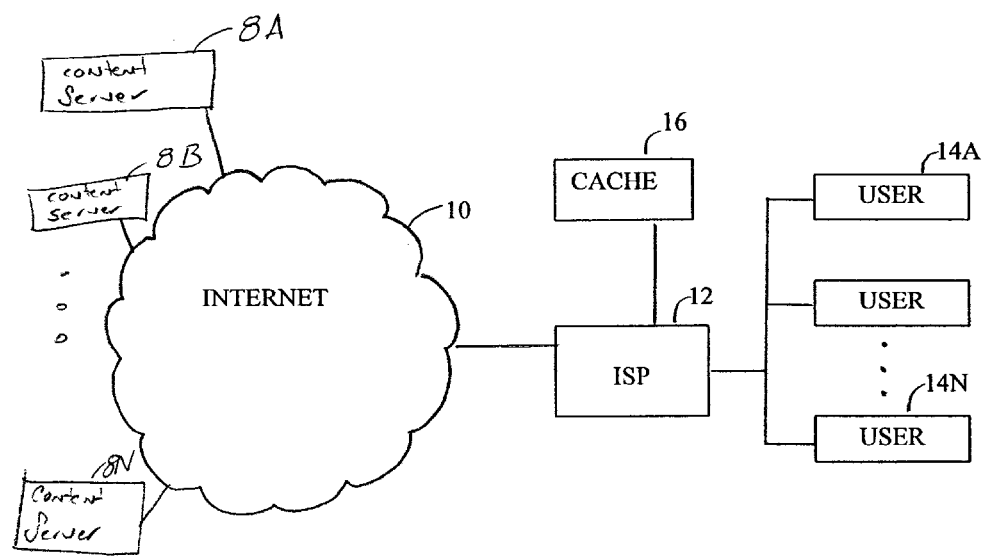
FIG. 1 is a block diagram showing a typical Internet digital data system.
Figure 2:
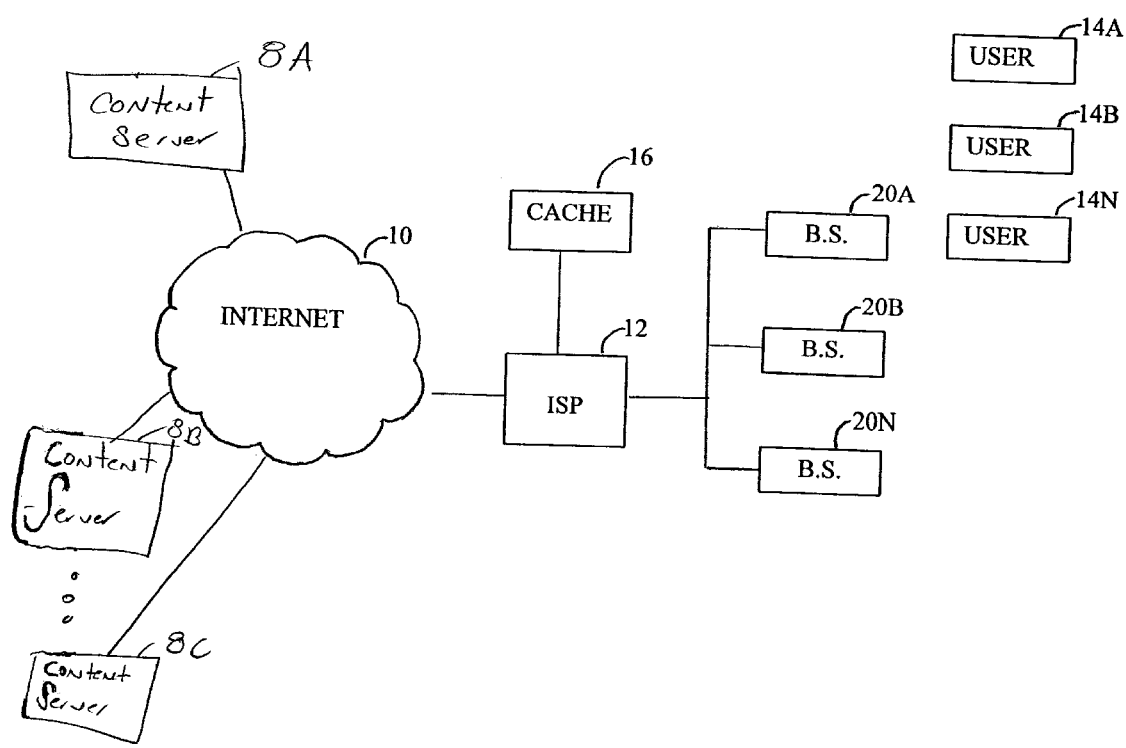
FIG. 2 is a block diagram of a prior art digital data system providing Internet connection over a wireless link.
Figure 3:
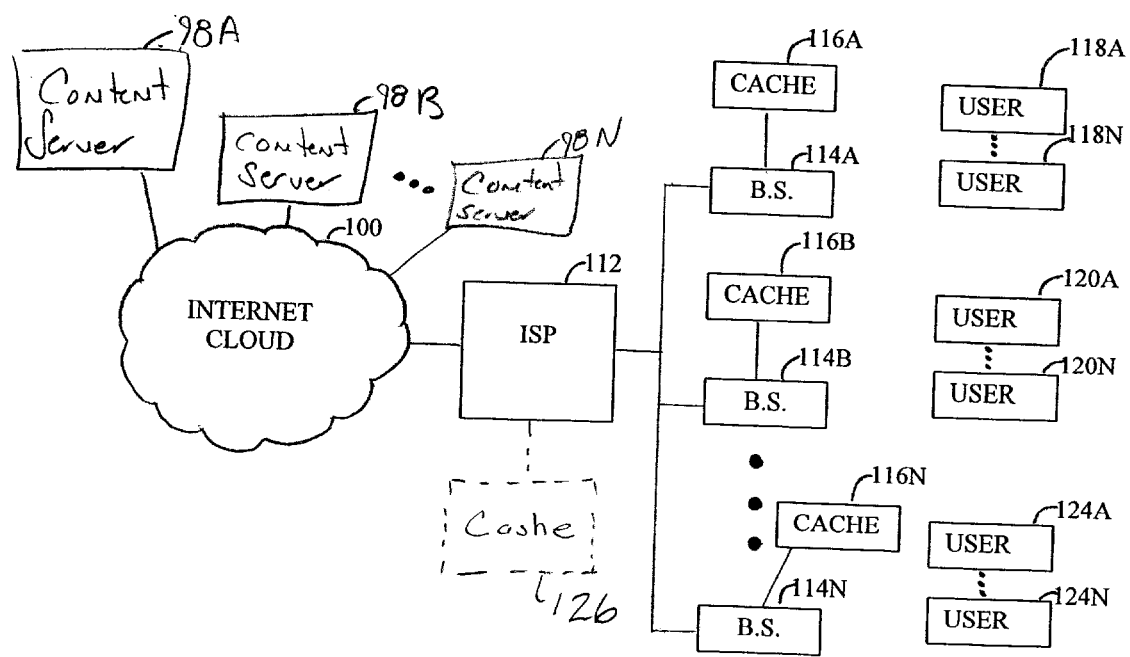
FIG. 3 is a block diagram of a digital data system providing Internet connection over a wireless link according to the invention.

FIG. 3 is a block diagram of one embodiment of the invention. In FIG. 3, a central controller, such as an Internet service provider 112, is coupled to a digital data network, such as an Internet cloud 100 to provide connection to a group of content servers 98A–98N. In addition, the Internet service provider 112 is coupled to a series of base stations 114A–114N. Generally, the Internet service provider 112 is coupled to the series of base stations 114A–114N via a base station controller as well as a series of high capacity digital data links.

Each base station 114A–114N provides service to a corresponding physical coverage area through the use of distributed antenna sites. In one embodiment, the base stations are terrestrial base stations such as those found in a typical mobile wireless or stationary wireless telecommunications system. In another embodiment, the base stations may be co-located with one another and may provide service to distinct physical coverage areas by means of satellites, broadband fixed wireless or directional antennas. The users 118A–118N are located within the coverage area of the base station 114A. The users 120A–120N are located in the coverage area of base station 114B. The users 124A–124N are located in the coverage area of the base station 114N.

Each base station 114A–114N has a corresponding cache 116A–116N. The caches 116A–116N may be embodied as fast storage buffers or memories which can be accessed by a router and central processing unit within the corresponding base stations 114A–114N. The cache 116 is used to store information frequently requested by the users associated with the corresponding base station. The base station 114A may comprise a usage pattern algorithm which monitors the usage pattern of the users 118A–118N within its corresponding coverage area in order to determine which files and objects to store within the cache 116A, according to well know techniques. In one embodiment, the cache 116 stores frequently requested HTML files and objects. When a user such as the user 118A requests a web page, the corresponding base station, such as the base station 114A, intercepts and analyzes the series of requests for files and objects which are generated by the user 120. Thus, in contrast to the prior art, the base station 114A does not simply indiscriminately pass the remote unit requests to the Internet service provider but, instead, examines the content of the requests.

If one or more of the requested files or objects are available within the cache 116A, the base station 114A responds by retrieving the requested file or object from the cache 116A and forwarding it to the user 118A. Thus, the request need not be passed over the Internet service provider 112 or to the Internet cloud 100. If any requested file or object which is not available within the cache 116A, the base station 114A passes the corresponding request to the Internet service provider 112, which in turn may pass the request over Internet cloud 100 to one of the content servers 98A–98N. In one embodiment, the Internet service provider 112 also comprises a cache 126 which can be accessed by the Internet service provider 112 and, if a requested object is available in the cache 126, the Internet service provider 112 need not retrieve the file from the Internet cloud 100.

The configuration shown in FIG. 3 has many advantages. The connection between the Internet service provider 112 and the base stations 114A–114N is referred to as the backhaul. According to current costing structures, the cost of operating the backhaul is a substantial portion of the cost of providing a wireless network. By retrieving the information from the cache 116A, the base station 114A need not pass a message over the backhaul to the Internet service provider 112. Therefore, the configuration shown in FIG. 3 reduces the loading on the backhaul, thus reducing the cost of providing wireless service. In addition, procuring backhaul capacity on a timely basis can limit the ability of a wireless carrier to deploy a wireless system. By reducing the loading on the backhaul, the carrier can operate the system using a lower capacity backhaul, thus, reducing the backhaul capacity required to deploy a system.

In addition, by associating the cache 116A with a limited coverage area, the usage patterns of the users are more likely to be correlated with one another. For example, a typical Internet service provider provides coverage for a rather large geographic region. More particularly, an Internet service provider may provide coverage for an entire county covering many hundreds of square miles comprising several cities, smaller towns, and rural areas. In contrast, a typical terrestrial base station could provide coverage for an approximately 3–100 square mile coverage area. When a larger region is broken down into the smaller regions, the probability of a correlation in the requested pages among the users increases. For example, a coverage area which includes a downtown region is more likely to have a high number of users requesting legal, business, financial and tax information than a coverage area servicing a college campus. A coverage area providing coverage to an affluent neighborhood is more likely to have a higher concentration of requests for information concerning an upcoming equestrian event than a coverage area providing service to an industrialized factory campus.

Thus, the usage pattern algorithm which selects the files which are stored within the cache 116 is likely to be able to increase the percentage of requests which can be serviced directly from the cache 116 rather than through cache 126 or from the content servers 98. Thus, the configuration shown in FIG. 3 further reduces the backhaul traffic as well as the latency perceived by the user.

In one embodiment, the base station executes anticipatory caching. Anticipatory caching occurs when a file or object is retrieved and stored in the cache before the users request it. For example, many users access the newspaper in the morning. Anticipatory caching can be used to retrieve the files and embedded objects associated with the newspapers as they are the released by the publishers in the early morning when the demand on the wireless system is minimum. In this way, when the users begin to access the papers in early morning, at least some of the files and objects are available from the cache. Caching according to the invention also improves the efficiencies achieved by anticipatory caching. Residents of a college campus may be more likely to access a local or campus-wide newspaper rather than a national newspaper. Business users are more likely to access business and financial newspapers such as the Wall Street Journal. These regional differences are accommodated by the local caching system of the invention.

Another advantage associated with the configuration shown in FIG. 3 is that the wireless link also operates more efficiently than the prior art. If the wireless link is configured as a circuit switch system, when a user 118 makes a request to the base station, a resource is dedicated to that remote unit until a response is received. By decreasing the latency associated with the response to the request, the wireless link resources consumed by a remote unit user to make a request and receive a response can be reduced, thus, increasing the number of users which can be serviced by the system at any one time.

Using modern wireless communication techniques, the rate at which data can be transferred over the wireless link between the user 118 and the base station 114 can be faster than the rate at which the Internet cloud 100 can provide information. Thus, by providing information directly from the cache 1116, the rate at which data is passed over the wireless link need not be artificially lowered in order to accommodate the slower transmission rate of the Internet cloud 100. This in turn can increase overall system capacity so that the system can accommodate more users.

Figure 4:
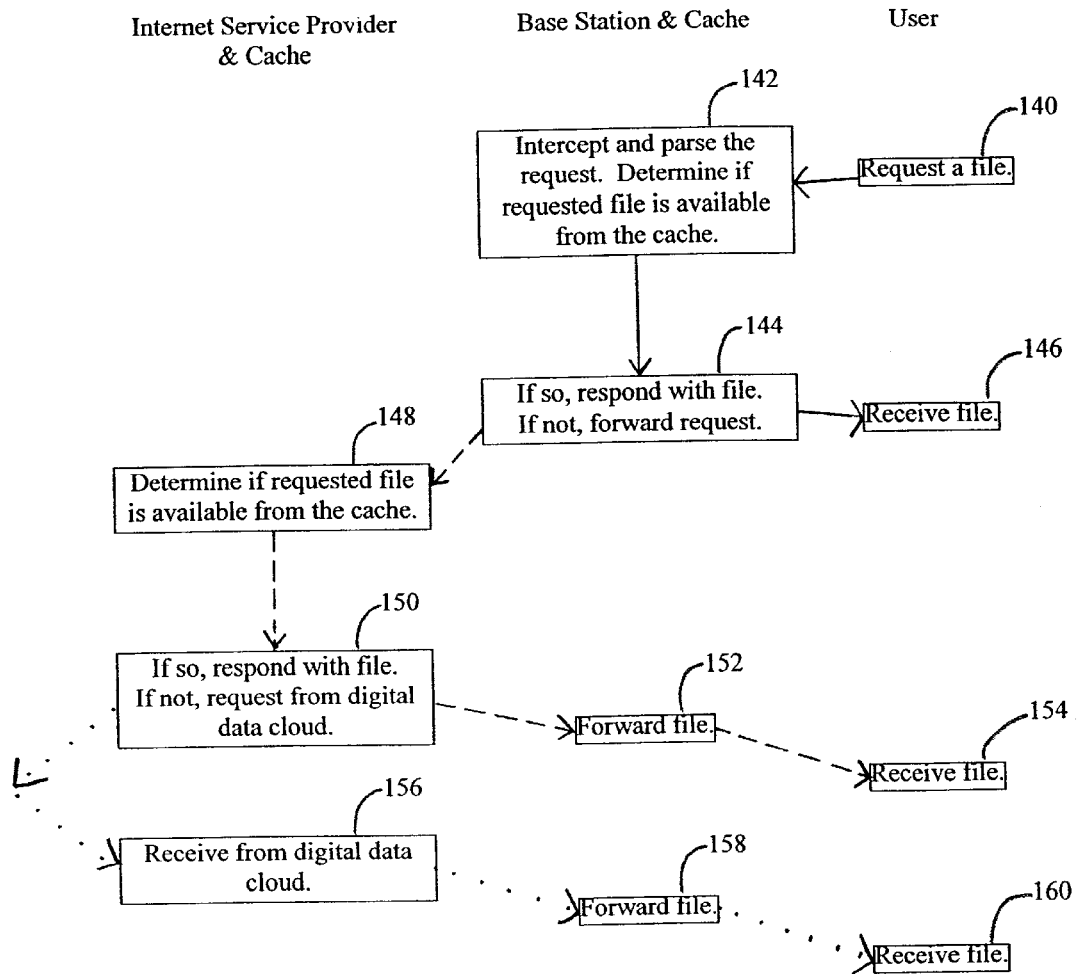
FIG. 4 is a flow chart illustrating operation in accordance with one embodiment invention.

FIG. 4 is a flow chart illustrating operation in accordance with one embodiment of the invention. In block 140, the user requests a file or object. The user forwards the request in a message to the base station over the wireless link. In block 142, the base station intercepts and parses the request. For example, the base station examines the contents of the request in the same manner as the Internet service provider, according to well-known techniques to identify the message. The base station also determines if the requested file or object is available from the base station cache. As noted above, in a preferred environment, the cache is co-located with the base station or is associated specifically with the base station. In block 144, if the file or object is available from the cache, the base station forwards the file or object to the user from the cache. The user receives the file or object in block 146. Thus, flow from block 140 to block 142 to block 144 and back to block 146 provides a rapid response to the user's request without utilizing backhaul resources, Internet service provider resources or digital data cloud resources.

If the requested file or object is not available at the cache at the base station, in block 144, the base station forwards the request to the Internet service provider over the backhaul as shown by the dashed line in FIG. 4. In response, in block 148, the Internet service provider determines if the requested file or object is available from a cache associated with the Internet service provider. If so, in block 150, the Internet service provider forwards the file or object to the base station as shown by the dashed line in FIG. 4. In block 152, the base station forwards the file or object to the remote unit. As shown by the dashed line, the user receives the file or object in block 154. If the file or object is not available in the cache associated with the Internet service provider, in block 150, the Internet service provider requests the file or object from a content server via the internet cloud according to well known techniques as indicated by the dotted line in FIG. 4. In block 156, the Internet service provider receives the file or object and forwards it to the base station as shown by the dotted line in FIG. 4. The base station receives the file or object and in block 158 forwards the file or object to the user. In block 160, the user receives the file or object.

In parallel with the operation shown in FIG. 4, a usage pattern algorithm is executed at the base station. For example, in block 142, in which the base station intercepts and parses the request, the base station may also forward a designation of the requested file or object to the usage pattern algorithm for use by the usage pattern algorithm in determining the contents of the associated cache.

In one embodiment, a single cache is associated with more than one antenna site. For example, two base stations may share a cache. In another embodiment, some of the base stations comprise distinct sectors that provide service to a subsection of the limited physical coverage area associated with the base station. In such a case, a single cache may be provided for use by users in each sector, or one or more caches may be provided for use by users in a subset of the total number of sectors. In yet another embodiment, only a subset of the base stations within a wireless system have a local cache.

The invention may be embodied in other specific forms without departing from its spirit or central characteristics.

The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of wireless data transfer comprising:

receiving a message over a wireless link at a wireless base station, wherein the wireless base station is an intermediary between at least one remote unit and an internet service provider;

caching data in a cache at said wireless base station wherein caching includes obtaining information that is independent of remote unit requests and that relates to a selected demographic of users that are serviced by the wireless base station;

identifying a requested information from said message at said wireless base station;

determining whether said requested information is available from the cache in said wireless base station;

forwarding said requested information from said wireless base station to the remote unit if said requested information is available within said cache; and forwarding said message to the internet service provider if said requested information is not available from said cache.

2. The method of claim 1, further comprising selecting information for storage in said memory based upon usage patterns of requested information received by said wireless base station.

3. The method of claim 1, further comprising:

receiving said message from said wireless base station at said internet service provider;

identifying a requested information from said message at said internet service provider;

determining whether said requested information is available from a memory associated with said internet service provider;

forwarding said requested information to said wireless base station if said requested information is available within said memory associated with said internet service provider; and forwarding said message to a network if said requested information file is not available from said memory associated with said internet service provider.

4. The method of claim 1, wherein said wireless base station provides service to a limited portion of a wireless system.

5. A wireless system comprising:

a plurality of wireless base stations, each of said plurality of wireless base stations servicing remote units located within a corresponding limited physical coverage area;

an internet service provider coupled to each of said plurality of wireless base stations, wherein the wireless base station is an intermediary between the remote units and an internet service provider;

a network coupled to said internet service provider and coupled to each of said plurality of wireless base stations via said internet service provider; and a cache in a first wireless base station of said plurality of wireless base stations and storing digital data retrieved over said network;

wherein when said first wireless base station receives a message from a wireless user requesting a file and said file is stored within said cache, said first wireless base station identifies said file from said message, retrieves said file from said cache and forwards said file to said wireless user, wherein the first wireless base station caches data in the cache, and wherein caching includes obtaining one or more files that are independent of requests by the remote units and that relate to a selected demographic of users that are serviced by the first wireless base station.

6. The wireless system of claim 5 wherein each of said plurality of wireless base stations is located within said corresponding limited physical coverage area.

7. The wireless system of claim 5 wherein each of said plurality of wireless base stations provides service to said limited physical coverage area via the use of a satellite link.

8. The wireless system of claim 5 further comprising a usage pattern algorithm for identifying said digital data to be stored in said cache.

9. The wireless system of claim 5 further comprising an anticipatory caching algorithm for identifying said digital data to be stored in said cache.

10. The wireless system of claim 5 wherein said file is an embedded Internet object.

11. A system for wireless data transfer comprising:

means for receiving a message over a wireless link at a wireless base station;

means for identifying a requested file from said message at said wireless base station, wherein the wireless base station is an intermediary between a remote unit and an internet service provider;

means for determining whether said requested file is available from a cache in said wireless base station;

means for forwarding said requested file from said wireless base station to a-remote unit if said requested file is available within said memory; and means for forwarding said message to the internet service provider if said requested file is not available from said memory, wherein the wireless base station caches data in the cache, and wherein caching includes obtaining one or more files that are independent of previous requests and that relate to a selected demographic of users that are serviced by the wireless base station.

12. The system of claim 11, further comprising means for selecting files for storage in said memory based upon usage patterns of requested files received by said wireless base station.

13. The system of claim 11, further comprising: means for receiving said message from said wireless base station at said internet service provider;

means for identifying a requested file from said message at said internet service provider;

means for determining whether said requested file is available from a cache in said internet service provider;

means for forwarding said requested file to said wireless base station if said requested file is available within said cache in said internet service provider; and means for forwarding said message to a network if said requested file is not available from said cache in said internet service provider.

14. A system comprising:

a wireless base station adapted to service at least one remote unit located within a corresponding limited physical coverage area, wherein the wireless base station is coupled to an internet service provider, wherein the wireless base station comprises a cache for storing digital data provided by the internet service provider, wherein when the wireless base station receives a message from a wireless user requesting a file and the file is stored within the cache, the wireless base station identifies the file from the message, retrieves the file from the cache and forwards the file to the wireless user, wherein the wireless base station is adapted to cache data in the cache, and wherein caching includes obtaining one or more files that are independent of requests by the remote unit and that relate to a selected demographic of users that are serviced by the wireless base station.

15. The wireless system of claim 14, wherein the wireless base stations is located within the corresponding limited physical coverage area.

16. The wireless system of claim 14, further comprising a usage pattern algorithm for identifying the digital data to be stored in the cache.

17. The wireless system of claim 14, further comprising an anticipatory caching algorithm for identifying the digital data to be stored in the cache.

18. A method of wireless data transfer comprising:

receiving a message over a wireless link at a wireless base station, wherein the wireless base station is an intermediary between at least one remote unit and an internet service provider;

caching data in a cache at said wireless base station, wherein the data is cached at least in part independently of site access of any remote user wherein the cache includes information that has been selectively received based upon demographics of users that are serviced by the wireless base station;

identifying requested information from said message at said wireless base station;

determining whether said requested information is available from the cache in said wireless base station;

forwarding said requested information from said wireless base station to the remote unit if said requested information is available within said cache; and forwarding said message to the internet service provider if said requested information is not available from said cache.

19. The method of claim 18, further comprising selecting information for storage in said memory based upon usage patterns of requested information received by said wireless base station.

20. The method of claim 18, further comprising:

receiving said message from said wireless base station at said internet service provider;

identifying requested information from said message at said internet service provider;

determining whether said requested information is available from a memory associated with said internet service provider;

forwarding said requested information to said wireless base station if said requested information is available within said memory associated with said internet service provider; and forwarding said message to a network if said requested information is not available from said memory associated with said internet service provider.

21. The method of claim 18, wherein said wireless base station provides service to a limited portion of a wireless system.

* * * * *

UNITED STATES PATENT AND TRADEMARK OFFICE
CERTIFICATE OF CORRECTION

PATENT NO. : 6,941,338 B1
APPLICATION NO. : 09/388236
DATED : September 6, 2005
INVENTOR(S) : James S. Madsen It is certified that error appears in the above-identified patent and that said Letters Patent is hereby corrected as shown below:

On Title page item 56

On the first page, in column 1, under Foreign Patent Documents, line 5, after "2/1999" and insert -- G06F 0/ --.

On the first page, in column 2, under Other Publications, line 6, delete "caceh." and insert -- cache. -- therefor.

Column 5, line 30, before "cache 126" insert -- the --.

Column 7, line 13, in Claim 1, after "station" insert -- , --.

Column 7, line 19, in Claim 1, after "identifying" delete "a".

Column 7, line 36, in Claim 3, after "identifying" delete "a".

Column 7, line 47, in Claim 3, after "information" delete "file".

Column 8, line 35, in Claim 11, delete "a-remote" and insert -- a remote --, therefor.

Signed and Sealed this

Twenty-second Day of May, 2007

JON W. DUDAS
*Director of the United States Patent and Trademark Office*